Jan. 5, 1971   T. A. JOHANSSON ET AL   3,552,147
COMBINED OVERLOAD CLUTCH AND CHUCK
Filed Nov. 19, 1968   4 Sheets-Sheet 1
FIG. 1
FIG. 2
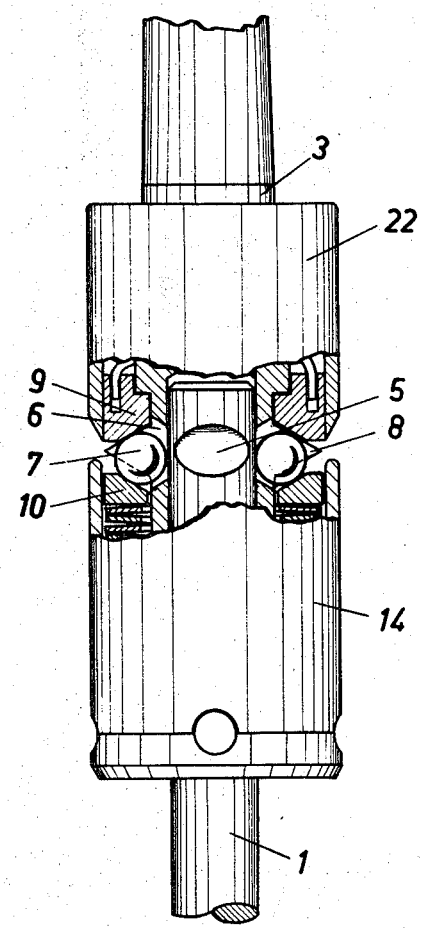
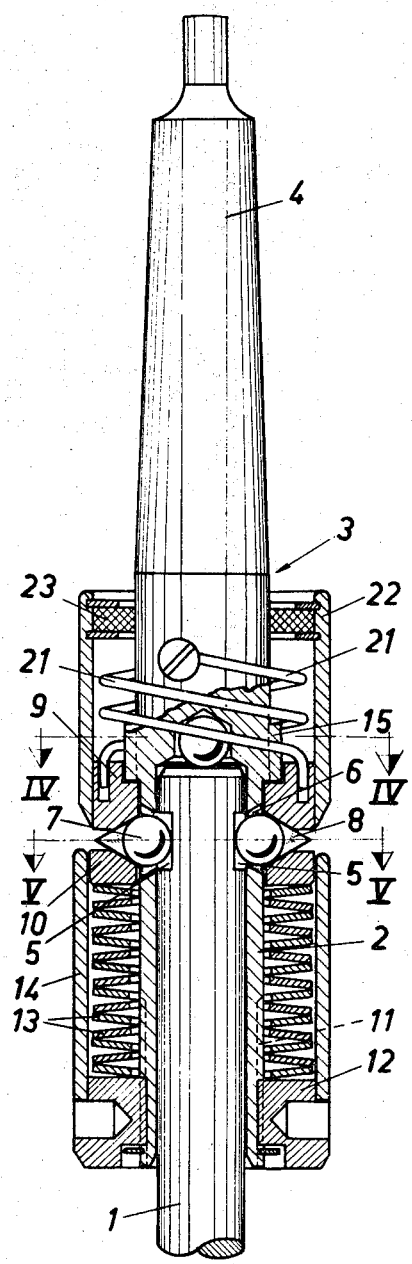
INVENTORS
T. A. JOHANSSON
L. A. WIKHOLM
By Glascock, Downing + Seebold
ATTORNEYS

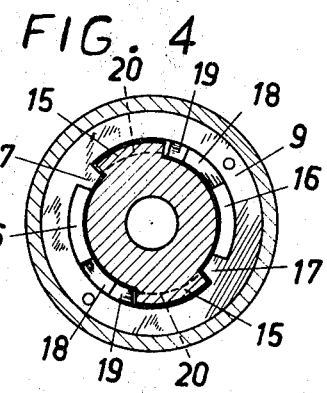
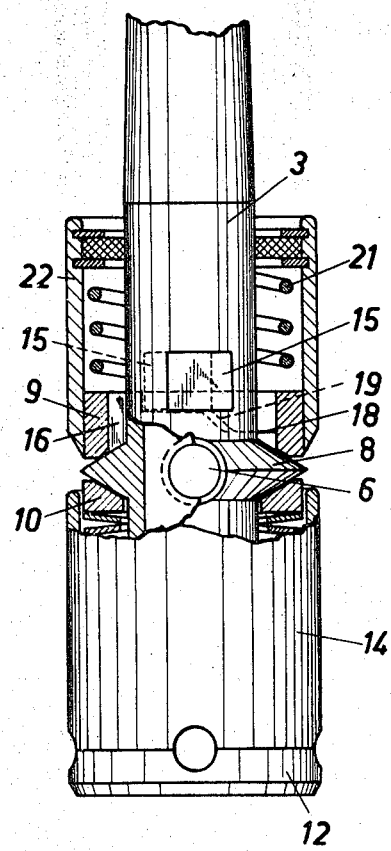
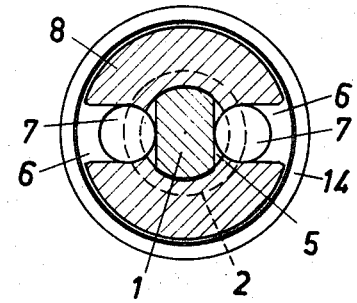
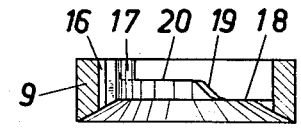

Jan. 5, 1971     T. A. JOHANSSON ET AL     3,552,147
COMBINED OVERLOAD CLUTCH AND CHUCK
Filed Nov. 19, 1968     4 Sheets-Sheet 3
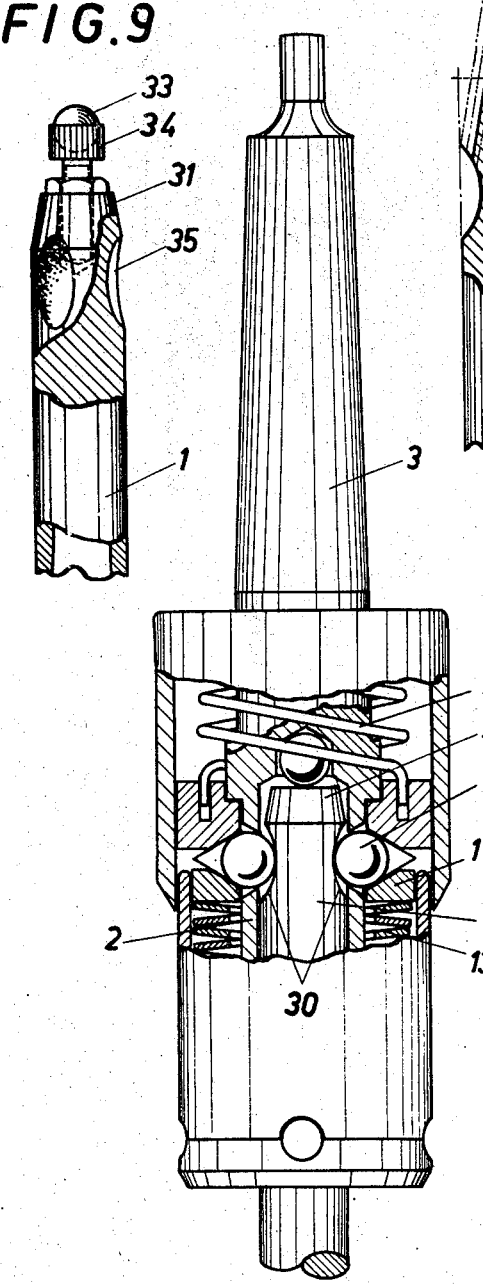
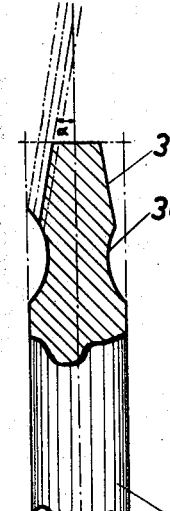
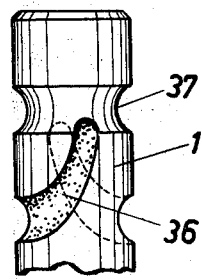
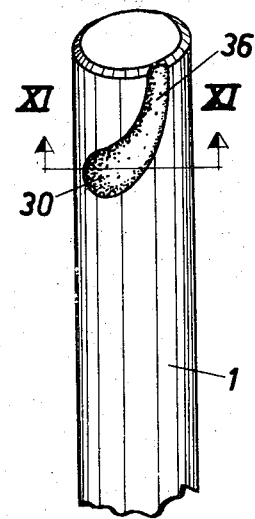
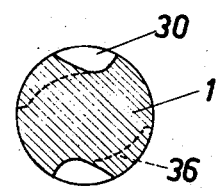

Jan. 5, 1971 T. A. JOHANSSON ET AL 3,552,147
COMBINED OVERLOAD CLUTCH AND CHUCK
Filed Nov. 19, 1968 4 Sheets-Sheet 4

United States Patent Office 3,552,147
Patented Jan. 5, 1971

3,552,147
COMBINED OVERLOAD CLUTCH AND CHUCK
Ture A. Johansson, Goteborg, and Tor Allan Wikholm, Partille, Sweden, assignors to Eriksbergs Mek. Verkstads Aktiebolag, Hisingen, Goteborg, Sweden
Filed Nov. 19, 1968, Ser. No. 776,898
Claims priority, application Sweden, Nov. 24, 1967, 16,127; Dec. 13, 1967, 17,135
Int. Cl. F16d 7/00, 43/20
U.S. Cl. 64—29                                                    11 Claims

ABSTRACT OF THE DISCLOSURE

A chuck, especially for mounting a rotatable tool in a working machine, is devised as an overload clutch, which means that a first member (the tool shaft), is provided with at least two peripheral grooves located eccentrically in relation to the axis of rotation. The other tubular member (the chuck part of the machine) is opposite to each groove in a first member mounted therein provided with a radially directed recess in which a rolling body, e.g. a steel ball is fitted. This body cooperates with a bevelled surface in the tubular member and is subjected to an elastic pressure by a spring. When the torque becomes too great, so that the first member tends to turn in relation to the enclosing tubular member, the balls will be forced radially outwards along the bevelled surface. The clutch may be devised in such a manner that the tool shaft is ejected from the clutch when this occurs and/or further in such a manner that the bevelled surface can be adjusted when the tool shaft is mounted or dismounted to minimize the resistance offered by the balls.

BACKGROUND OF THE INVENTION

The present invention relates to a combined overload clutch and chuck for the transfer of an adjustable torque between two shafts, one of which extends into a tubular part of the other.

Overload clutches are commonly used between two shafts in order to prevent damage to the same if the torque to be transferred from one shaft to the other should exceed a predetermined value.

The object of the present invention is to provide a simple and reliable device, which is capable of transferring high torques and which is furthermore designed as a chuck, for permitting a rapid connection and disconnection of the two shafts.

SUMMARY OF THE INVENTION

The invention is mainly characterized in one of the shafts being provided with at least two peripheral grooves located eccentrically in relation to the axis of rotation, and the tubular part of the other shaft opposite to each groove provided with a radially directed recess, a rolling body located in each recess and by means of an annulus surrounding the other shaft and loaded by a spring being forced towards the corresponding groove as well as towards a seat of the other shaft.

BRIEF DESCRIPTION OF THE DRAWINGS

FIG. 1 shows a longitudinal section through an overload clutch according to the invention.
FIG. 2 shows a view similar to that in FIG. 1, but with the clutch open, in such a manner that the output shaft has lost its grip on the driving part.
FIG. 3 shows a partly cut-away side view of the clutch turned 90° in respect of FIG. 1.
FIGS. 4 and 5 are sections along lines IV—IV and V—V in FIG. 1,
and
FIG. 6 is a section through a member forming a seat and being designed as part of a bayonet clutch.
FIG. 7 shows an elevation, partly in section of a modified embodiment of the clutch and chuck.
FIG. 8 shows a slight modification of the top part of the first shaft in FIG. 7.
FIG. 9 shows a modified design of the top part of the first shaft.
FIG. 10 shows a modified design of the grooves in the first shaft,
and
FIG. 11 shows a cross section along line XI—XI of FIG. 10.
FIG. 12 shows a further modified design of the top part and the grooves in the first shaft.

DESCRIPTION OF THE PREFERRED EMBODIMENTS

Figure 13:
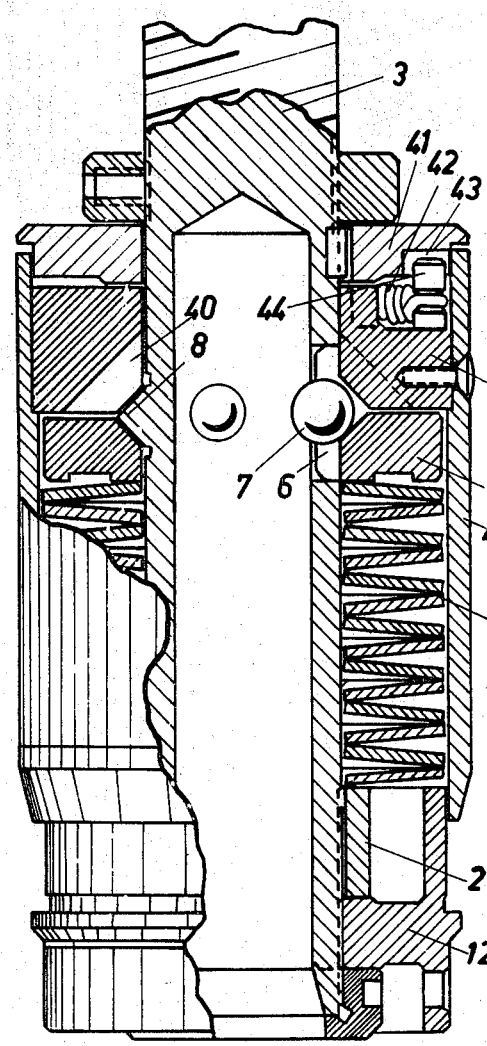
FIG. 13 shows a further modified design of the clutch and chuck.

In the drawings 1 denotes the first shaft which may be the shaft end of a machine tool and such shaft is inserted in a tubular end 2 of a second shaft 3. The end of the shaft 3 remote from the tubular part 2 shaped like a morse cone 4 which, in the usual manner, is adapted to be fitted into a mounting at the end of a driving shaft (not shown) of a machine. The shaft 1 is provided with two peripheral grooves 5 located eccentrically in relation to the axis of rotation. Each groove is designed as a sunk portion milled at right angles to the longitudinal axis of the shaft, and has the shape of a circle segment as seen in a cross section through the shaft. Opposite each of the grooves 5 a recess 6 is arranged in the tubular part 2, and a rolling body 7 such as a ball is located in each of these recesses. The recesses 6 are arranged in a flange 8 outwardly directed from the tubular part 2. The cross section of the flange has the shape of a isosceles triangle, i.e. it will end in a point. The longitudinal middle plane (the height of the triangle) is perpendicular to the longitudinal axis of the tubular member 2. A first annulus 10 abuts against one surface of the flange 8 and a second annulus 9 abuts against the other surface of the flange. The first annulus is axially displaceable along the tubular member 2, the outer end of which is provided with a threaded part 11. A nut 12 cooperates with the threaded part and acts as abutment for a number of spring washers 13. The pressure of the spring washers upon the annulus 10 will depend on the degree to which the nut 12 is threaded on the tubular member. In this manner, the radially inwards directed pressure of the rolling bodies 7 against the plane bottoms of the groove 5 may be adjusted. If the tool inserted into the tubular member 2 will be subjected to a bigger torque than desired and determined by the nut 12, the eccentric grooves 5 at the shaft end of the tool will force the rolling bodies 7 out of the recesses 6 in such a manner that the first annulus 10 will be displaced towards the nut 12, against the action of the spring washers 13. The shaft may thereafter continue to rotate without moving the shaft 1.

The spring washers 13 and the first annulus 10 are enclosed in a protecting sleeve 14, which is fixedly connected to nut 12. The surface of the first annulus 10, as well as the surface of the second annulus 9, which acts as a seat for the rolling bodies, are bevelled in a direction towards the rolling bodies. The bevel angle should correspond to the oblique sides of the flange 8.

The second annulus 9 forms a fixed seat for the rolling bodies 7, when the devices act as a clutch. In order to remove the shaft 1 rapidly from the tubular member 2, the annulus 9 may be turned in relation to the shaft 3, against the action of a spring 21. Hence, the annulus 9 may be axially displaced in a direction away from the rolling bodies 7, which are made free to permit the removal of the shaft 1. To that end the shaft 3 is provided with two external tongues 15 which cooperate with grooves on the inner surface of the annulus 9 turned towards the shaft 3 to form a bayonet clutch. This contains two axially extending grooves 16, the cross section of which is only slightly bigger than that of the tongues 15. These grooves 16 are at one end limited by a stop 17. On their other side they are terminated by a first step 18, which, by way of an inclined path 19, merges into a second step 20 located on a higher level than the step 18. By turning the annulus 9 from the position shown in FIG. 1 or 4 clockwise, the tongues 15 at the shaft 3 will slide along the inclined path 19 towards the step 18, which means that the annulus 9 will be displaced axially away from the flange 8. By a continued turning, the tongues 15 will be brought opposite the opening of grooves 16 in such a manner that the annulus 9 may be removed from shaft 3 in the direction of the morse cone 4. Annulus 9 is retained in the position shown in FIG. 1 by means of two helical springs 21 and the turning of the annulus must be made against the action of these springs. A protecting sleeve 22 is fixedly connected to the annulus 9 and encloses the springs 21. The sleeve is at the end remote from the annulus 9, provided with a guiding plate 23 of fiber material, which will guide the annulus and the protecting sleeve 22 to a concentric position in relation to shaft 3.

Especially with numerically governed machines, and where the tool is adapted for back-facing and thus may be subjected to pulling stresses, it is important that the tool is automatically cut out if it shows any tendency to stick in the workpiece and it is impossible immediately to cut off the machine.

FIGS. 7 to 11 shows various designs of the grooves in the first shaft for bringing about an automatic ejection of the tool from the clutch, if the tool tends to stick in the workpiece sufficient to displace the balls 7.

FIG. 7 corresponds to FIG. 1 but the plane-bottom grooves 5 are here substituted by shallow, part-spherical grooves 30. The top part of the shaft is frusto-conical at 31 in such a manner that the balls, once they have been forced out of the grooves, will slip along the conical surface, thereby forcing the shaft outwards.

FIG. 8 shows a slight modification of the top part of the shaft 1 in which the frusto-conical top part extends partly down along the grooves 30. This will facilitate the ejection of the tool shaft.

The degree to which the balls are retained in the grooves depend on how far the conical surface extends downwards. As indicated in FIG. 8 the angle α of inclination is the same, but the apex of the top angle may be located at different distances from the shaft.

FIG. 9, shows two further modifications of the top part of the shaft 1. In the previous embodiment, a ball 32 has been fitted in the shaft 3 at the bottom of the tubular part thereof to bear against the end face of shaft 1.

In the embodiment according to FIG. 9, a corresponding ball 33 is mounted in a member 34 threaded into a bore at the top of the shaft 1, and three grooves 35 are provided for cooperation with three balls mounted in the chuck. The frusto-conical end surface 31 extends downwards to include the uppermost parts of the grooves 35. The balls will easily slip along the inclined surface, when the torque becomes too big and the tool is ejected from the chuck.

In the embodiment shown in FIGS. 10 and 11, grooves 36 extend in a direction towards the blank end of the shaft, and have a depth which decreases in such direction. Each groove runs along a helical path which coincides with the direction of rotation of the overload clutch when the two shafts are mounted in the chuck. Also with this design, the tool will be displaced axially out of the overload clutch-chuck if the working tool for one cause or another should stick in the workpiece, or if the load thereon should become too great. If the shaft 1 belongs to a back-facing tool, the cutting edges thereof will be removed from the body of the workpiece. The grooves 36 are, preferably along their length, designed with a rounded cross section corresponding to the shape of the ball cooperating with the groove.

If it is desirable to limit the axial displacement of the tool, the grooves 36 will, as shown in FIG. 12, end in a circumferential groove 37 running along the shaft end. The depth of this groove is equal to, or somewhat bigger than the biggest depth of the groove 36.

It is, of course, necessary that the balls are forced with a certain pressure against the bottom of the grooves in order that the clutch shall be able to transfer the desired torque. This will necessitate the application of a considerable force for inserting the tool shaft into the clutch and for removing it therefrom.

Figure 14:
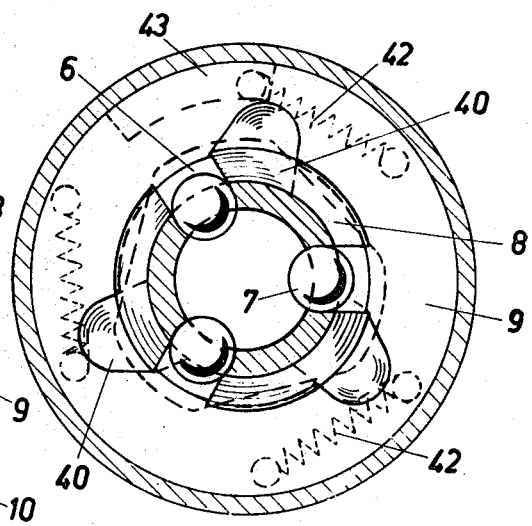
FIGS. 14 and 15, are cross sections therethrough at the level of the balls, with the same in working and in "free" position, respectively (FIG. 15 being on a slightly smaller scale than FIG. 14).
Figure 15:
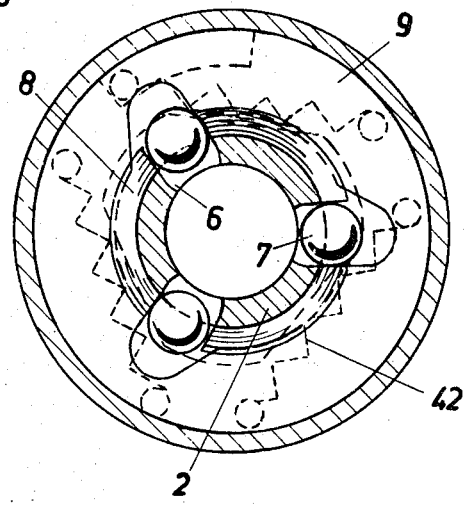

In order to make possible a simple mounting and dismounting of the tool without disturbing the working of the chuck the same may, as shown in FIGS. 13, 14, and 15, be designed in such a manner, that the seat 9 is provided with recesses corresponding to those in the tubular end part, with the second recesses being so located in relation to the recesses in the tubular end part that they, as seen in the direction of the normal rotation of the chuck, will be located ahead of the recesses in the tubular shaft end. The annulus in which the seat is provided is designed so that it, to a limited degree, may be turned in relation to the shaft, contrary to the direction of rotation such that the two sets of recesses may be brought opposite to each other. In this manner the balls may be pushed outwards without any resistance, when the tool shaft 1 is pushed into the tubular end of the other shaft.

The tubular end part is here provided with three balls 7 and the annulus containing the seat 9 is provided with three recesses 40, each being of sufficient size to receive a ball 7. A washer 41 is fitted to the shaft 3 above the seat-annulus 9 and between the washer and the annulus three springs 42 are mounted. These tend to keep the annulus in such a position that recesses 40 are remote from recesses 6. In juxtaposed surfaces of the seat-annulus 9 and the washer 41, recess 43 is formed and into which a pin 44 extends. This may serve as a fitting for one of the springs, and will together with recess 43 limit the angular movement of the seat-annulus in relation to the shaft.

The operation of the device will best be understood by a comparison of FIGS. 14 and 15, it being pointed out that FIG. 15 is shown on a slightly smaller scale than FIG. 14.

FIG. 14 shows the balls in working position, without any tool shaft being inserted in the clutch. The normal direction of rotation is denoted by the arrow and the recesses 40 will thus be located ahead of recesses 6. If the tubular end should be turned in relation to a fixed tool, the torque in the upper part thereof will, as above described, force the balls outwards between the bevelled surfaces of the seat-annulus 9 and the annulus 10. This presupposes a certain torque which is determined by spring washers 13.

If it is desirable to insert a tool shaft into the tubular end, or to remove it therefrom, the seat-annulus 9 is turned contrary to the normal direction of rotation as far as is permitted by recess 43 and pin 44. The recesses 40 will then, as shown in FIG. 15 be located directly opposite to the recesses 6, and the balls 7 may without application of great force be pushed outwards.

In this embodiment, a protecting cover 45 for spring washers 13 is mounted on the seat-annulus 9 and will provide a good grip for performing the desired turning.

The above shown embodiments are some examples only and further modifications are possible within the scope of the appended claims. The number of balls will depend on the torque to be transferred and also the size of the clutch, and instead of balls cylindrical or conical rollers may be utilized.

What we claim is:
1. In a combined overload clutch and chuck for the transfer of torque between two shafts, with one shaft extending into a tubular part of the other shaft, said one shaft having an insert end and at least two peripheral grooves at said insert end located eccentrically in relation to the axis of rotation, said tubular part having a corresponding number of radially directed recesses in matching positions, a rolling body in each of said recesses, a first annulus encircling said tubular part of said other shaft and providing a seat having a bevelled surface, a second annulus encircling said tubular part and provided with a bevelled surface, said bevelled surfaces extending towards the rolling body, spring means cooperable with said first annulus for forcing said rolling bodies towards said seat as well as towards the bottom of said grooves, and said second annulus being provided with outwardly directed tongues defining part of a bayonette clutch including grooves on the inside of said second annulus, said tongues and grooves extending along helical paths in such a manner that said second annulus by turning movements may be brought into various axial positions in relation to the recesses.

2. In a combined overload clutch and chuck for the transfer of torque between two shafts, with one shaft extending into a tubular part of the other shaft, said one shaft having an insert end and at least two peripheral grooves at said insert end located eccentrically in relation to the axis of rotation, said tubular part having a corresponding number of radially directed recesses in matching positions, a rolling body in each of said recesses, a first annulus encircling said tubular part of said other shaft and provided with a seat having a bevelled surface extending toward the rolling bodies, a second annulus encircling said tubular part having a bevelled surface extending toward said rolling bodies, said tubular part having an outwardly directed flange located opposite said recesses, said flange having a triangular cross section, the sides thereof defining the same angle to a plane perpendicular to the longitudinal axis of the tubular part as the bevelled surfaces of said first and second annulus, and a spring means cooperable with said first annulus for forcing said rolling bodies towards said seat as well as towards the bottom of said grooves.

3. The overload clutch according to claim 2 in which said spring means is biased between said first annulus and a nut threadedly engaging the outer end of said tubular part of said other shaft.

4. The overload clutch according to claim 3 in which said peripheral grooves are defined by sunk plane portions located at right angles to the longitudinal axis of said one shaft and having the configuration of a segment of a circle viewed in a cross section through said one shaft.

5. The overload clutch according to claim 2 in which the grooves at the one shaft are designed as shallow, part-spherical recesses.

6. The overload clutch according to claim 2 as utilized with shafts for rotating tools in which the top end of the shaft is provided with surfaces forming inclined pathways for the rolling bodies leading away from the working position of said bodies.

7. The overload clutch according to claim 6 in which the inclined surfaces form part of a frsuto-conical top part of the shaft extending downwards from the blank end to include the uppermost part of the grooves.

8. The overload clutch according to claim 6 in which each groove is continued by a helical recess having a depth decreasing in the direction away from its connection to the groove.

9. The overload clutch according to claim 8 in which the helical recesses ends in a circumferential groove in the envelop surface of the shaft.

10. The overload clutch according to claim 2 in which the seat to a certain degree turnable in relation thereto, said annulus being provided with recesses in number, size and pitching corresponding to the recesses in the tubular part, and means to normally retain the annulus in a position in which the recesses therein are located just ahead of the corresponding grooves in the tubular part as viewed in the ordinary direction of rotating.

11. The overload clutch according to claim 10, in which a washer is fitted to the other shaft adjacent to the annulus, a number of resilient members located between said washer and the annulus to retain the same in the desired working position and to permit a backwards turning of the annulus to bring the two seats of recesses into matching positions.

References Cited

UNITED STATES PATENTS

| | | | |
|---|---|---|---|
| 2,263,709 | 11/1941 | Sittert | 6 4—29(X) |
| 2,642,297 | 6/1953 | Hanna | 279—24(X) |
| 2,775,137 | 12/1956 | Chung | 279—22(UX) |

FOREIGN PATENTS

| | | | |
|---|---|---|---|
| 1,202,595 | 7/1959 | France | 64—29 |
| 622,079 | 4/1949 | Great Britain | 64—29 |

ALLAN D. HERRMANN, Primary Examiner

U.S. Cl. X.R.

81—52.4; 279—24, 30; 192—56